United States Patent
Soghomonian et al.

(10) Patent No.: US 6,891,306 B1
(45) Date of Patent: May 10, 2005

(54) ROTARY ELECTRIC MOTOR HAVING BOTH RADIAL AND AXIAL AIR GAP FLUX PATHS BETWEEN STATOR AND ROTOR SEGMENTS

(75) Inventors: Zareh Soghomonian, Reston, VA (US); Boris A. Maslov, Reston, VA (US)

(73) Assignee: Wavecrest Laboratories, LLC., Dulles, VA (US)

( * ) Notice: Subject to any disclaimer, the term of this patent is extended or adjusted under 35 U.S.C. 154(b) by 166 days.

(21) Appl. No.: 10/134,425

(22) Filed: Apr. 30, 2002

(51) Int. Cl.[7] .................... H02K 1/12; H02K 21/12
(52) U.S. Cl. ............... 310/218; 310/156.38; 310/216; 310/266
(58) Field of Search .................. 310/67 R, 75 R, 310/68 R, 268, 254, 216, 218, 166, 168, 259, 112, 156.38, 156.43, 265–266

(56) References Cited

U.S. PATENT DOCUMENTS

| | | | |
|---|---|---|---|
| 4,754,207 A | | 6/1988 | Heidelberg et al. ......... 310/254 |
| 4,761,590 A | | 8/1988 | Kaszman |
| 4,786,834 A | | 11/1988 | Grant et al. ................ 310/194 |
| 4,864,176 A | * | 9/1989 | Miller et al. ................ 310/194 |
| 5,625,241 A | * | 4/1997 | Ewing et al. .......... 310/156.37 |
| 5,786,645 A | * | 7/1998 | Obidniak .................. 310/68 R |
| 5,894,902 A | * | 4/1999 | Cho .......................... 180/65.5 |
| 5,952,756 A | | 9/1999 | Hsu et al. |
| 6,323,576 B1 | * | 11/2001 | Applegate ................... 310/268 |
| 6,346,759 B1 | * | 2/2002 | Suzuki et al. .............. 310/254 |
| 6,617,746 B1 | * | 9/2003 | Maslov et al. ............. 310/254 |

FOREIGN PATENT DOCUMENTS

| | | |
|---|---|---|
| WO | WO 00/48294 | 8/2000 |
| WO | WO 00/48297 | 8/2000 |

* cited by examiner

*Primary Examiner*—Tran Nguyen
(74) *Attorney, Agent, or Firm*—McDermott Will & Emery LLP

(57) ABSTRACT

In a rotary electric motor, a stator contains a plurality of separate electromagnet core segments disposed coaxially about an axis of rotation. The core segments are affixed, without ferromagnetic contact with each other, to a non-ferromagnetic support structure. The rotor is configured in a U-shaped annular ring that at least partially surrounds the annular stator to define two parallel axial air gaps between the rotor and stator respectively on opposite axial sides of the stator and at least one radial air gap. Permanent magnets are distributed on each inner surface of the U-shaped rotor annular ring that faces an air gap. A winding is formed on a core portion that links axially aligned stator poles to produce, when energized, magnetic poles of opposite polarity at the pole faces.

11 Claims, 8 Drawing Sheets

ROTARY ELECTRIC MOTOR HAVING BOTH RADIAL AND AXIAL AIR GAP FLUX PATHS BETWEEN STATOR AND ROTOR SEGMENTS

RELATED APPLICATIONS

This application contains subject matter related to copending U.S. application Ser. No. 09/826,423 of Maslov et al., filed Apr. 5, 2001 now U.S. Pat. No. 6,492,756, issued Dec. 10, 2002; copending U.S. application Ser. No. 09/826,422 of Maslov et al., filed Apr. 5, 2001, copending U.S. application Ser. No. 09/966,101 of Maslov et al., filed Oct. 1, 2001 now U.S. Pat. No. 6,617,746, issued Sep. 9, 2003; copending U.S. application Ser. No. 10/067,305, of Maslov et al., filed Feb. 7, 2002, now U.S. Pat. No. 6,710,502, issued Mar. 23, 2004; and copending U.S. application Ser. No. 10/134,365 of Maslov et al., filed Apr. 30, 2002, all commonly assigned with the present application. The disclosures of these applications are incorporated by reference herein.

FIELD OF THE INVENTION

The present invention relates to rotary electric motors, more particularly to motors having a plurality of permanent magnet rotor elements and ferromagnetically isolated stator elements with both axial and radial air gap flux paths between the rotor and stator elements.

BACKGROUND

The progressive improvement of electronic systems, such as microcontroller and microprocessor based applications for the control of motors, as well as the availability of improved portable power sources, has made the development of more efficient electric motor drives a compelling challenge. Electronically controlled pulsed energization of windings of motors offers the prospect of more flexible management of motor characteristics. By control of pulse width, duty cycle, and switched application of a power source to appropriate stator windings, functional versatility that is virtually indistinguishable from alternating current synchronous motor operation can be achieved. The use of permanent magnets in conjunction with such windings is advantageous in limiting current consumption.

The above-identified copending related U.S. patent application of Maslov et al., Ser. No. 09/826,423, identifies and addresses the need for an improved motor amenable to simplified manufacture and capable of efficient and flexible operating characteristics. It is highly desirable to attain smooth operation over a wide speed range, while maintaining a high torque output capability at minimum power consumption. The copending related U.S. applications incorporate electromagnet poles as isolated magnetically permeable structures configured in an annular ring, relatively thin in the radial direction, to provide advantageous effects. With this arrangement, flux can be concentrated, with virtually no loss or deleterious transformer interference effects in the electromagnet cores, as compared with prior art embodiments. While improvements in torque characteristics and efficiency are attainable with the structure of the identified copending application, further improvements remain desirable.

The Maslov et al. applications recognize that isolation of the electromagnet groups permits individual concentration of flux in the magnetic cores of the groups, with low flux loss and no deleterious transformer interference effects with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched.

Copending related U.S. patent application of Maslov et al., Ser. No. 09/966,101 describes benefits to be gained from utilization of three dimensional aspects of motor structure. Advantages are recognized from the use of materials such as a soft magnetically permeable medium that is amenable to formation of a variety of particular shapes. For example, core material may be manufactured from soft magnet grades of Fe, SiFe, SiFeCo, SiFeP powder material, each of which has a unique power loss, permeability and saturation level. Core geometries and core dimensions of stator elements, with relevant tolerances, can be formed without the need to form laminations and thus optimize the magnetic potential gradient developed between coupled poles of rotor permanent magnets and stator electromagnets. A structural configuration is disclosed wherein axially aligned stator poles and axially aligned rotor magnets provide highly concentrated flux distribution. Such configuration provides a greater number of poles with the same individual active air gap surface areas and/or greater total active air gap surface area than conventional motors having the same air gap diameter.

In summary, concentration of flux, maximization of flux, minimization of flux loss and transformer interference effects, are all contributing factors in the attainment of efficient motor operation with high torque capability. Motor structural configurations in which multiple poles are in axial alignment to provide efficient operation at high torque output have been described in the above-identified copending applications. Such arrangements, due to the relatively great volume occupied by the large number of stator core elements and rotor poles, are advantageous for use in environments in which space and weight considerations are not at a premium. There is a continuing need for motor structural configurations that provide these improved attributes as well as economy of size and geometry.

The above-identified copending Maslov et al. application, addresses these needs by development of motor structural configurations to increase the surface areas of opposing stator poles and rotor poles across a plurality of air gaps. The relatively larger surfaces in which flux can be concentrated promote high torque capacity. These concepts are further structurally developed in the present invention.

DISCLOSURE OF THE INVENTION

Advantages of the present invention are achieved, at least in part, by increasing those surface areas of stator and rotor elements that interact to produce electromotive force. The structural features of one such configuration of the invention are embodied in a motor that comprises a rotor and a stator in which a plurality of separated electromagnet core segments are disposed coaxially about an axis of rotation. The stator core segments form an annular stator ring bounded by an inner and outer diameter. The core segments are affixed, without ferromagnetic contact with each other, to a non-ferromagnetic support structure.

The rotor is configured in an annular ring that at least partially surrounds the annular stator to define a radial air gap and a pair of axial air gaps through which flux paths are produced to generate electromotive force. The rotor ring is formed of magnetically permeable material with a U-shaped cross-sectional configuration having sides joined by a cross portion. A plurality of permanent magnets are distributed along inner surfaces of the rotor sides and cross portion, thereby facing the two axial air gaps and the radial air gap. The permanent magnets successively alternate in polarity along the circumference of the rotor ring surfaces. The permanent magnets on the two side portions are respectively in axial alignment with each other and have opposite magnetic polarities. Each relatively flat permanent magnet is a magnetic dipole having one magnetic polarity at its surface facing an air gap and the opposite magnetic polarity at its surface mounted to the side portion or cross portion. The permanent magnets mounted on the side portions thus have magnetic polar orientation in the axial direction while the permanent magnets mounted on the cross portion have magnetic polar orientation in the radial direction.

Each stator electromagnet core segment comprises a pair of poles aligned in a direction generally parallel to the axis of rotation and joined by a ferromagnetic connecting portion having a winding formed thereon. Each stator electromagnet pole may be of a generally rectangular configuration, viewed in a cross-section taken in a plane parallel to the axis of rotation. The pole thus has a first pole surface, generally perpendicular to the axis of rotation and facing one of the axial air gaps, and a second surface facing the radial air gap. The winding, when energized, produces magnetic poles of opposite polarity at the pole faces. A change in the direction of current effects a reversal of the magnetic polarities.

In one embodiment of the invention, the plurality of permanent magnets on the cross portion comprises two sets of magnets that are in axial alignment with each other and the magnets on the side portions. Each pair of adjacent side portion magnets and cross portion magnets are of the same magnetic polarity and opposite to the pair of side portion magnets and cross portion magnets located at the axially opposite side. When the winding of a stator electromagnet is energized in the vicinity of a set of aligned side portion and cross portion magnets, opposite magnetic polarities are formed in the electromagnet poles. The adjacent side portion and cross portion magnets aid each other in the production of attractive forces with respect to the stator poles that face the magnets across the axial and radial air gaps. Flux distribution is improved by the concentration of flux through the increased surfaces of the stator poles and rotor magnets, while minimizing stray flux.

In a beneficial variation of the above described motor structure, each stator pole face has an L-shaped cross sectional pole configuration, one portion of the "L" facing a rotor side portion across an axial air gap and the other portion of the "L" facing, at the outer stator diameter, the rotor cross portion across the radial air gap. In this arrangement, the stator pole surface area for flux distribution can be increased by the L extension of the radial surface, while maintaining the dimension of the connecting portion between poles that accommodates the winding.

As a further variation of the present invention, each adjacent pair of side portion and cross portion permanent magnets may be replaced with a single permanent magnet that has an L-shaped cross-sectional configuration. The magnet is mounted at inner surfaces of the corner junction of a side portion and the cross portion to provide maximum flux distribution. The magnet is a dipole having the same magnetic polarity on both inner surfaces. The magnet thus has two inner surfaces, each interactively facing a surface of a respective stator pole.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
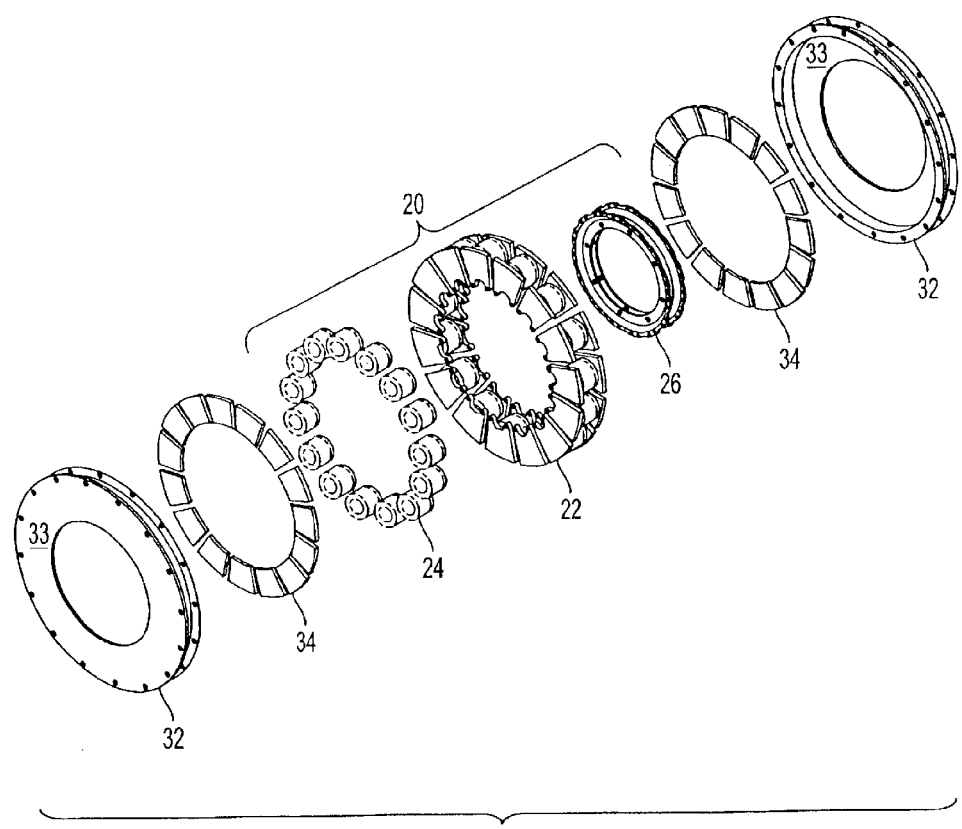
FIG. 1 is an exploded view illustrating motor components of the present invention.

FIG. 1 is a three-dimensional exploded view illustrating components of the invention. The components in combination form the assembled motor construction illustrated in FIG. 2. For simplicity of explanation, elements that are not necessary for understanding the present invention have not been illustrated. Reference is made to the aforementioned copending applications for a more detailed description of such features. The elements indicated by bracket 20, when assembled, form a stator annular ring that is centered about an axis of rotation. The stator ring comprises a plurality of ferromagnetically isolated electromagnets having core portions 22 upon which are to be formed windings 24. Non-ferromagnetic ring 26 is a support structure for the individual electromagnets. A more detailed illustration of the stator ring construction is provided in FIG. 4. End portions 32 and permanent magnets 34, when assembled, form an annular ring centered about the axis of rotation and at least partially surround the stator ring.

Figure 2:
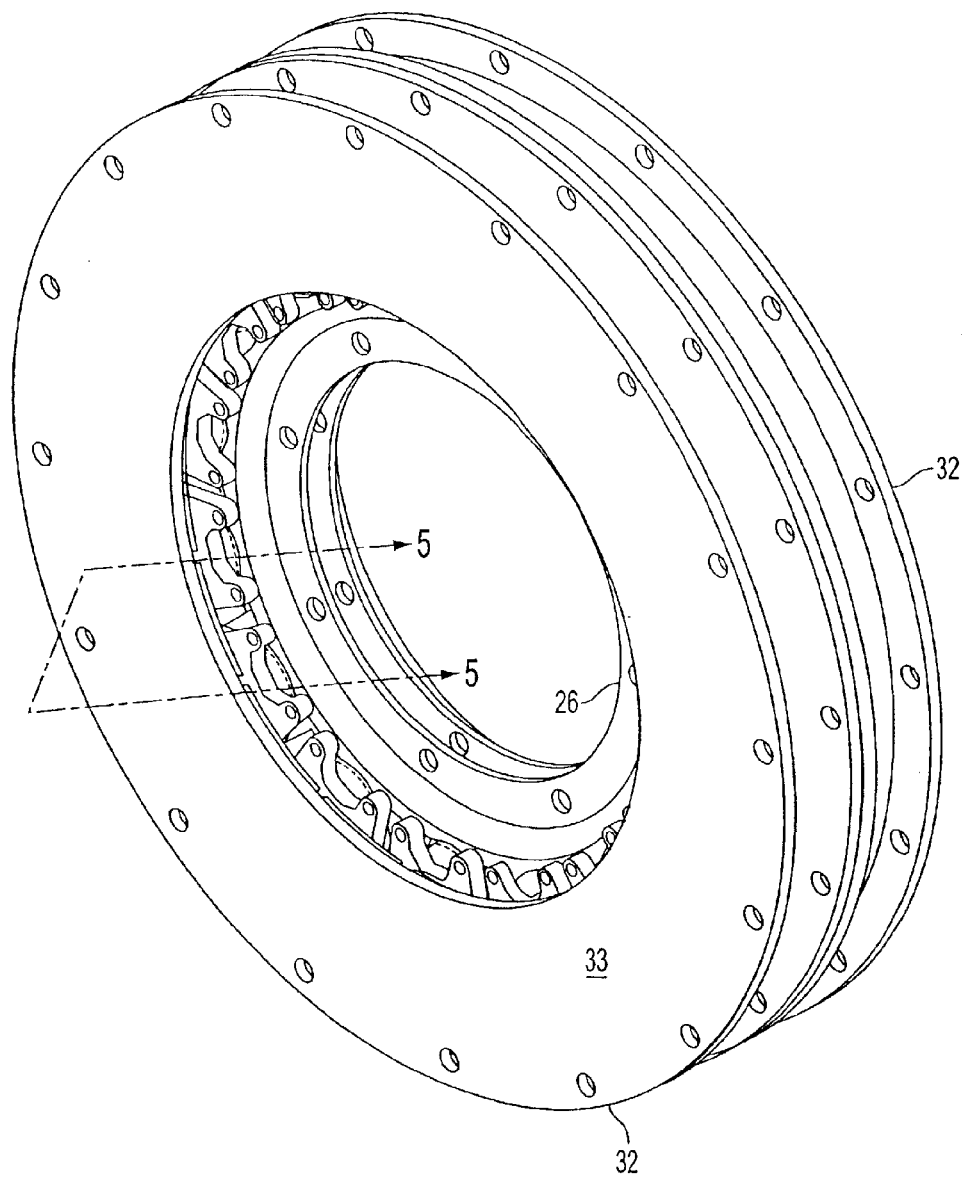
FIG. 2 is a three-dimensional perspective view of the motor elements of FIG. 1 in an assembled state.

The stator and rotor rings are shown in their assembled state in the three-dimensional perspective view of FIG. 2. Each rotor end portion 32 is generally in the shape of an open cylinder having an axis coincident with the axis of rotation. A disk shaped end surface 33, substantially perpendicular to the axis, extends between an inner and outer diameter. A tubular edge surface is oriented in the axial direction. The end surface extends beyond the outer diameter of the edge surface by a flange portion. A similar flange extends from the opposite axial side of the edge surface. Both flanges having through holes distributed near their peripheries. The through holes of the inner surface flanges are in alignment for attachment of the end portions to each other by any conventional means, the edge surfaces thereby forming a cross portion of a U-shaped cross section. The through holes of the outer flanges enable attachment of the rotor ring to plates, not shown, to be coupled with a shaft at the axis of rotation.

Figure 3:
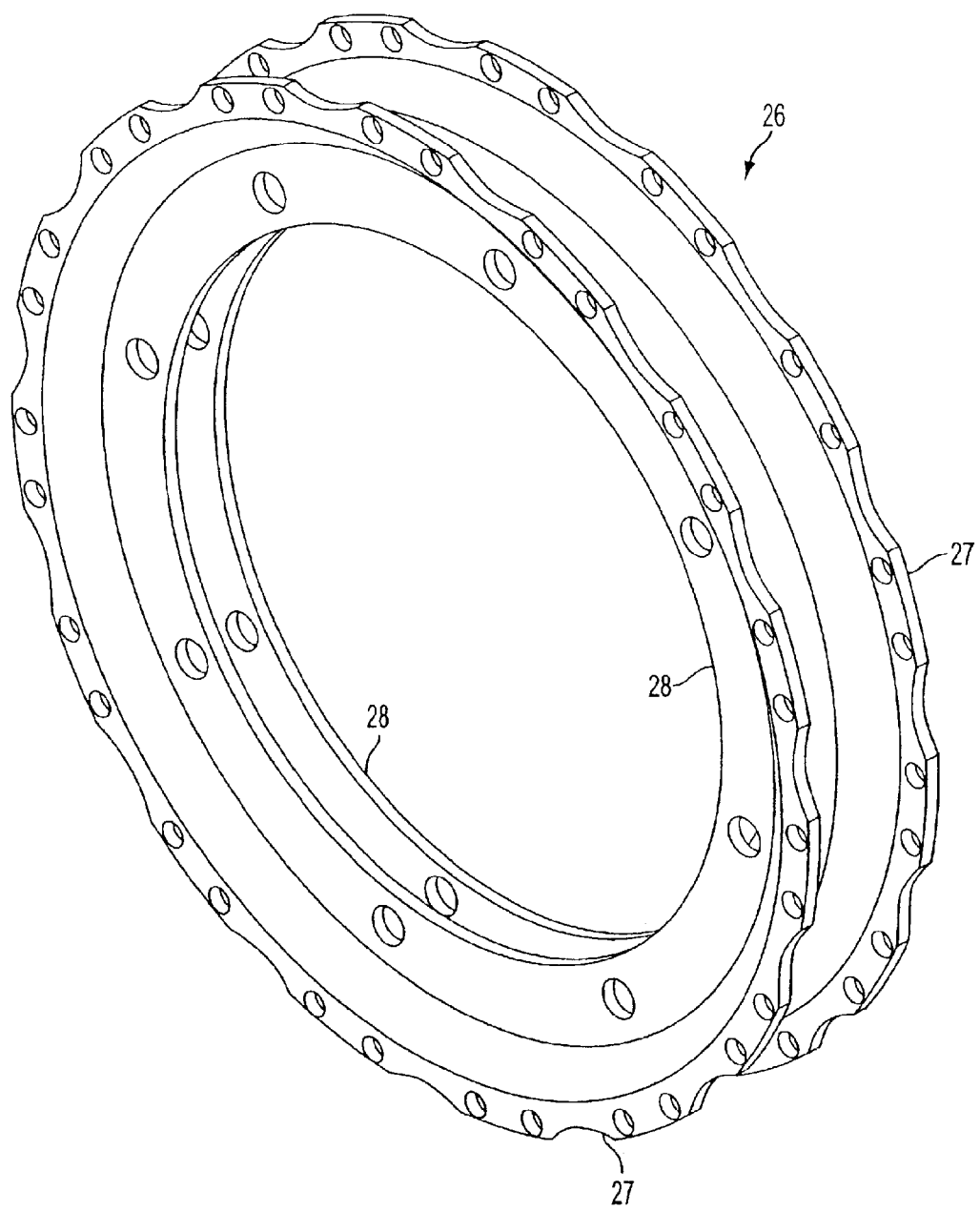
FIG. 3 is a three-dimensional perspective view of stator ring support structure for the arrangement of FIG. 2.

The stator support ring 26, shown in the three-dimensional perspective view of FIG. 3, is an axially disposed cylinder having at each end an upper flange 27 and a lower flange 28. Upper flange 27 has regularly spaced protrusions that contain a pair of through holes. The axial spacing between flanges 27 is set to accommodate the stator electromagnet core elements 22. Lower flange 28, which has a generally circular periphery, has through holes that are used for mounting the ring to an appropriate stationary structure. The number and location of the through holes in flange 28 can be adjusted to coordinate with a mounting arrangement for attachment thereto in a conventional manner.

Figure 4:
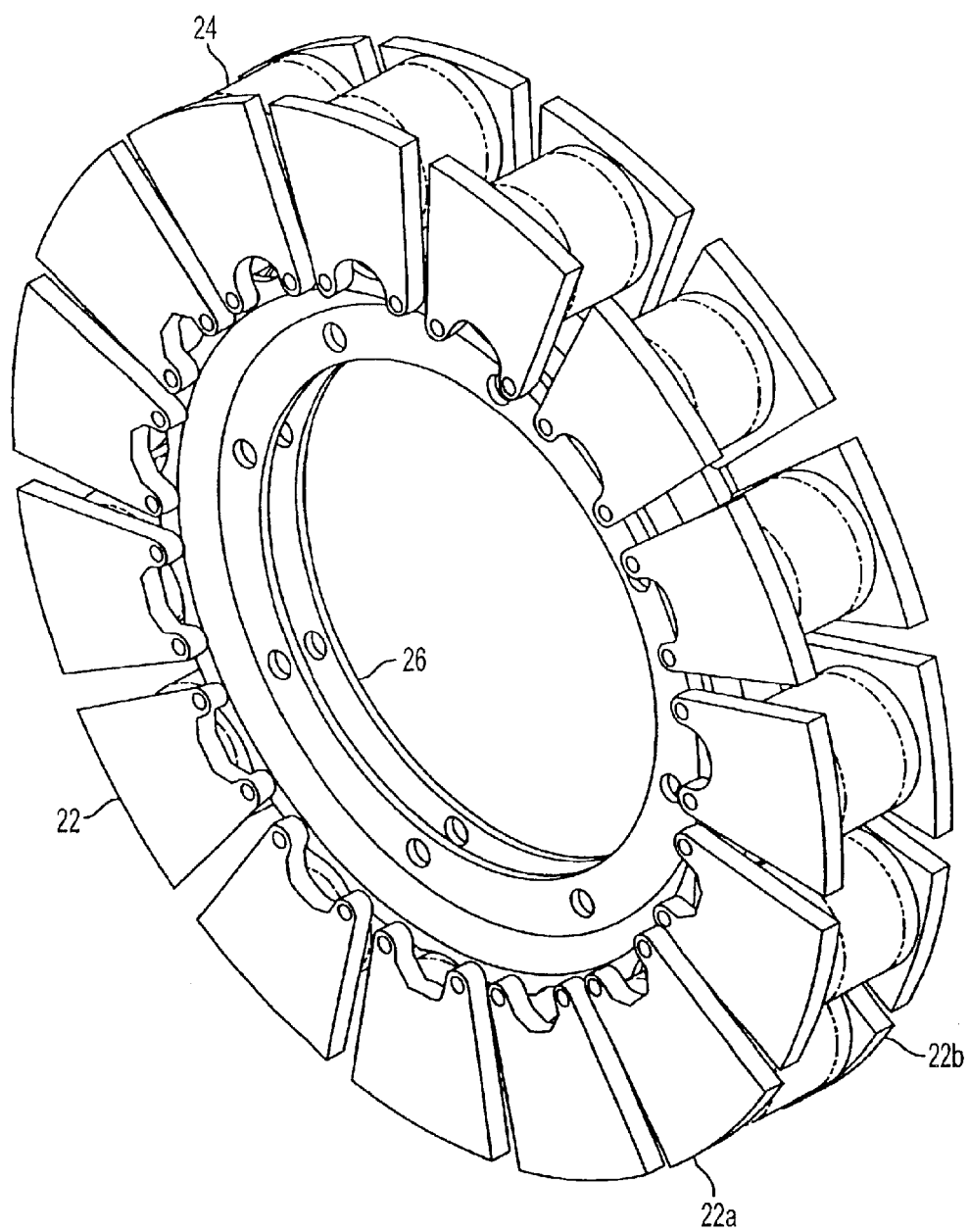
FIG. 4 is a three-dimensional perspective view of the stator core elements in combination with the support structure of the present invention.

As shown in FIG. 4, each of the stator electromagnet core elements is configured with an axially aligned pole pair 22*a* and 22*b*, having pole faces that lie substantially in radial planes. Through holes are provided at the base of each pole for alignment with the through holes in the flanges 27 of ring 26. Each core element is mounted via the through holes at the base of the poles to an aligned protrusion on each of the flanges 27. The electromagnet elements are separated from direct contact with each other. The clearance between adjacent magnets may be varied to reduce the cross-talk (transformer effect) between magnetic circuits. Ring 26 is formed of non-ferromagnetic material, such as aluminum. In operation, each electromagnet thus forms a flux path that is independent and isolated from the flux paths of other electromagnets.

In the preferred implementation, the stator is joined to a stationary shaft. The rotor, which at least partially surrounds the stator, is coupled to the shaft through appropriate interconnecting structure and bearings. It is within the contemplation of the invention, however, that the shaft instead may be fixed to the rotor and, therefore, rotatable. In the latter arrangement the shaft would be coupled to the stator supporting structure through bearings.

Figure 5:
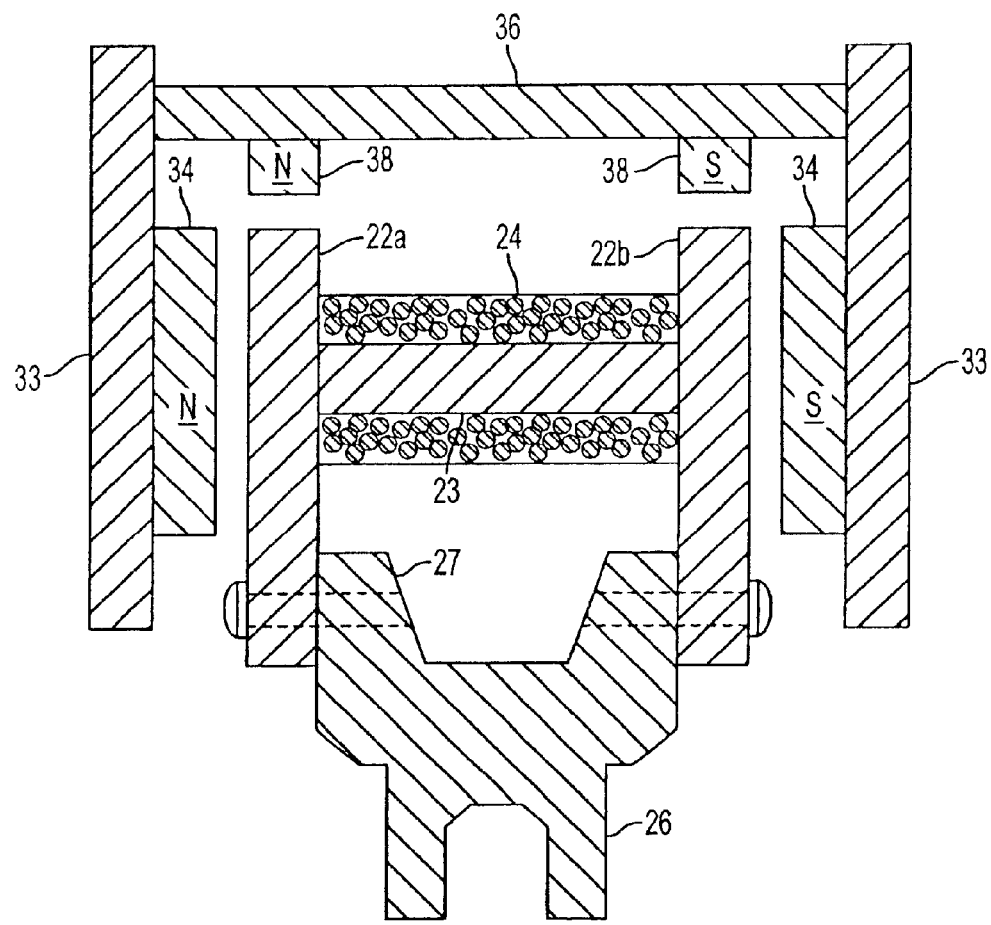
FIG. 5 is a cross section taken along dotted line plane 5—5 of FIG. 2 in accordance with the present invention.

FIG. 5 is a cross-sectional view, represented diagrammatically, of the stator and rotor rings taken at the plane along the dotted-line 5—5 of FIG. 2. Seen in cross-section, the rotor ring 32 has side portions 33 that are connected by cross portion 36. The side portions and the cross portion preferably are fabricated of ferromagnetic material that forms a "back iron" upon which permanent magnets 34 are mounted, distributed in a manner as shown in FIG. 1. The back iron serves to concentrate flux in the magnets. It is to be understood that favorable motor operation can still be obtained if the back iron, and its attendant flux concentration capability, is replaced by a nonmagnetic structure.

Each side portion comprises a set of permanent magnets, the magnets of both sets in axial alignment with each other. The magnets are relatively thin dipole magnets having substantially planar pole faces. The entirety of each pole face exhibits a single magnetic polarity, opposite to the polarity at the back surface of the magnet. Adjacent magnets successively alternate in magnetic polarity along the side portion ring. The magnets on the opposing side portions that are in alignment with each other have opposite magnetic polarities. Permanent dipole magnets 38 are mounted on and distributed along the cross portion ring 36. Magnets 38 are equal in number and in alignment the magnets 34 on the side portions. Magnets 38 have pole face surfaces along the radial air gap. Magnets 38 are of the same magnetic polarities as that of the magnets 37 that are adjacent thereto, whereby the flux produced across the radial air gap aids the flux produced across the axial air gaps. For purposes of illustration only, the adjacent pair of permanent magnets at the left are shown as north poles and the adjacent pair of permanent magnets at the right are shown as south poles at their inner surfaces.

Stator electromagnet 22 has a generally H-shaped cross-section of ferromagnetic material. Winding 24 is formed on a linking portion that joins the two poles at each axial end. The stator poles are each generally rectangular in cross section. In the position shown in the drawing, each stator pole has pole faces respectively substantially parallel to the faces of rotor magnets 34 and 38. Two axial and radial air gaps are thus formed between the stator and rotor pole faces. In operation, energization of winding 24 is appropriately switched to magnetize the pole pair with opposite magnetic polarities. Prior to the approach of the rotor to the stator electromagnet shown in the drawing, winding 24 will have been energized with a current that forms a south pole at the left pole 22*a* and a north pole at the right pole 22*b*. At an appropriate time and angular position, current may be switched off or reversed. Flux paths are thereby generated across the air gaps to produce magnetomotive force. Reference is made to the aforementioned copending applications for description of appropriate switching control means. The configuration of FIG. 5 provides a large air gap surface area in which torque producing flux can be focussed, while minimizing the structural volume of the motor. Ferromagnetic isolation of the stator electromagnets minimizes stray flux losses.

Figure 6:
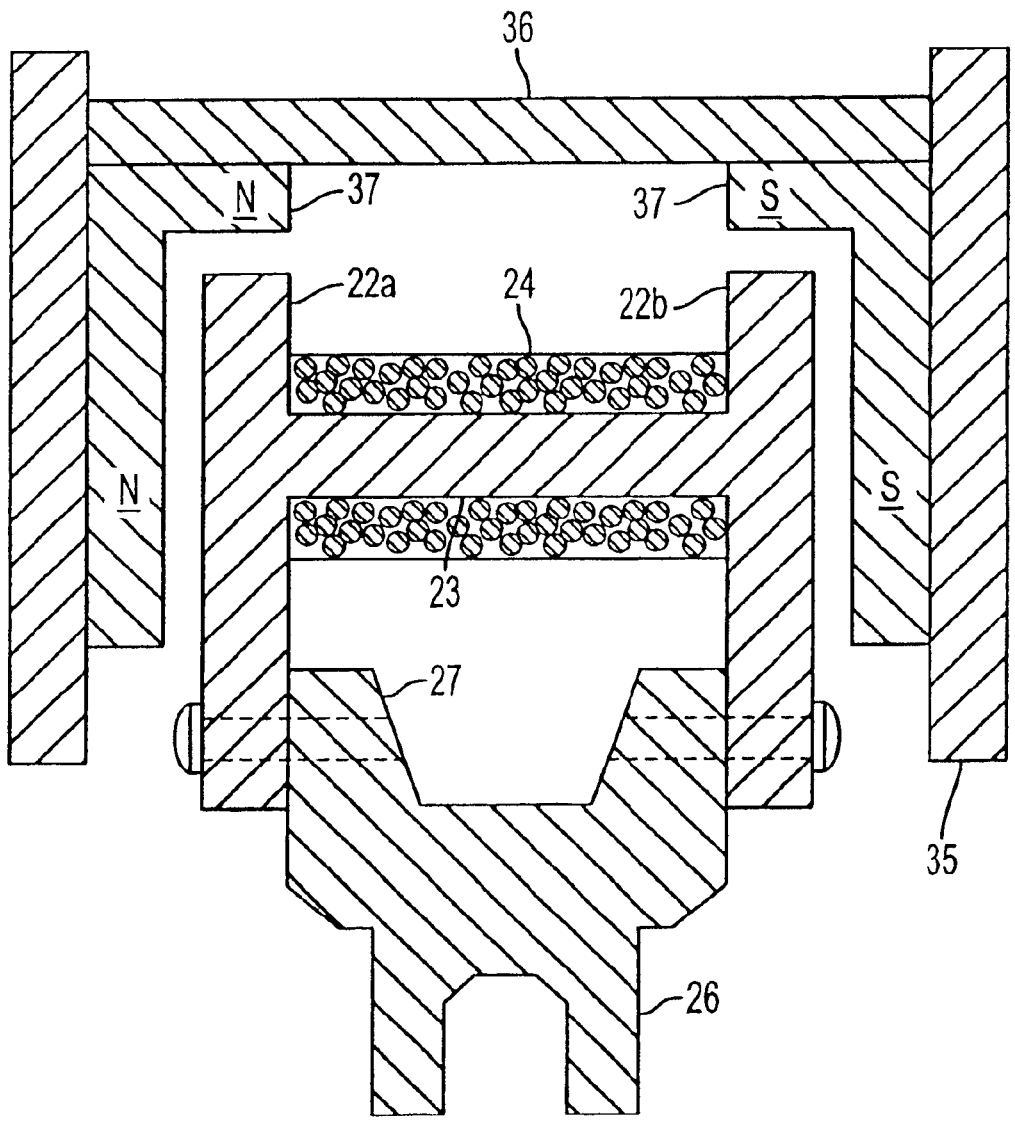
FIG. 6 is a variation of the cross section shown in FIG. 5 in accordance with the present invention.

FIG. 6 is a cross-sectional view of a variation of the structure of FIG. 5. Magnets 34 and 38 of FIG. 5, which are positioned respectively on the back iron side portion 35 and cross portion 36, have been replaced by L-shaped magnet 37. Each magnet is positioned at the corner of the side and corner portions with a first surface mounted to one of the rotor sides and a second surface mounted to the cross portion. The opposing magnets are in alignment with each other and of opposite magnetic polarity.

Figure 7:
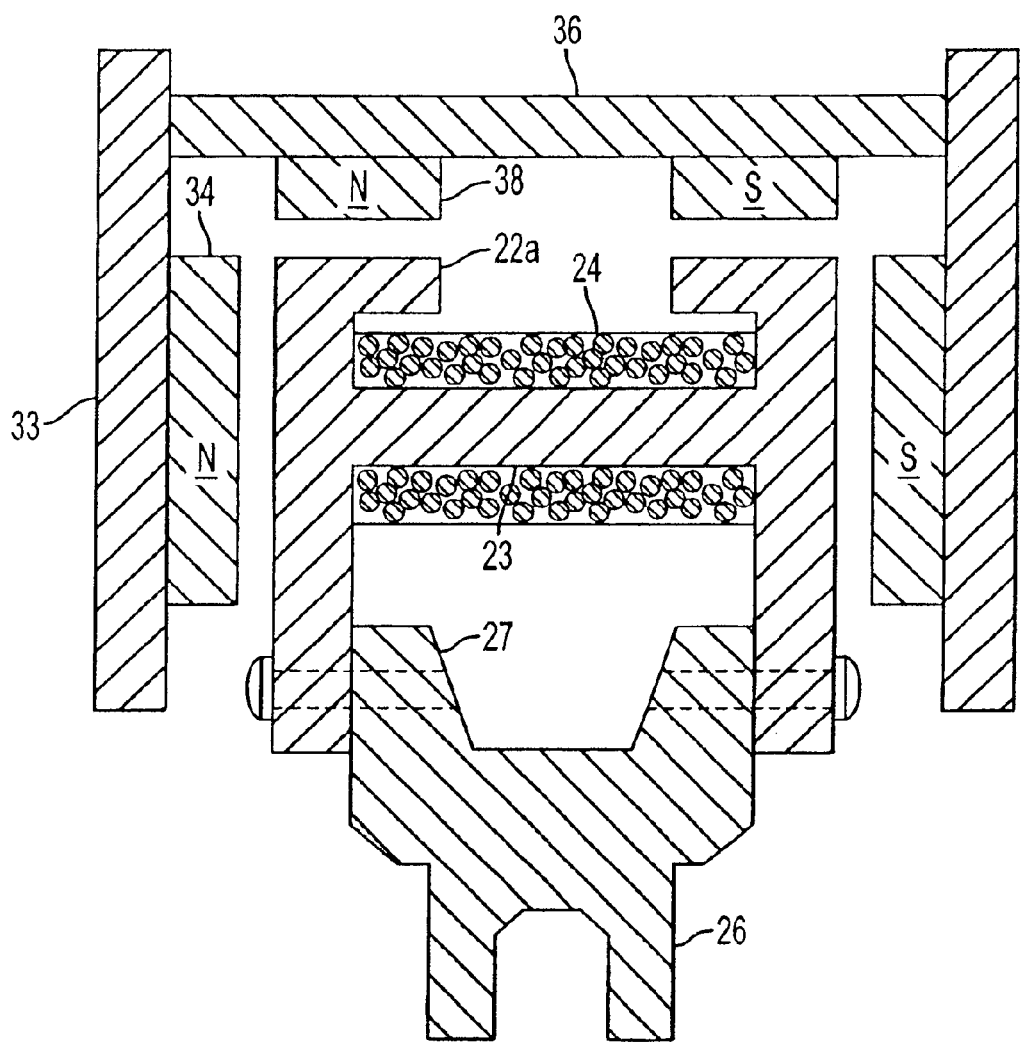
FIG. 7 is another variation of the cross section shown in FIG. 5 in accordance with the present invention.
Figure 8:
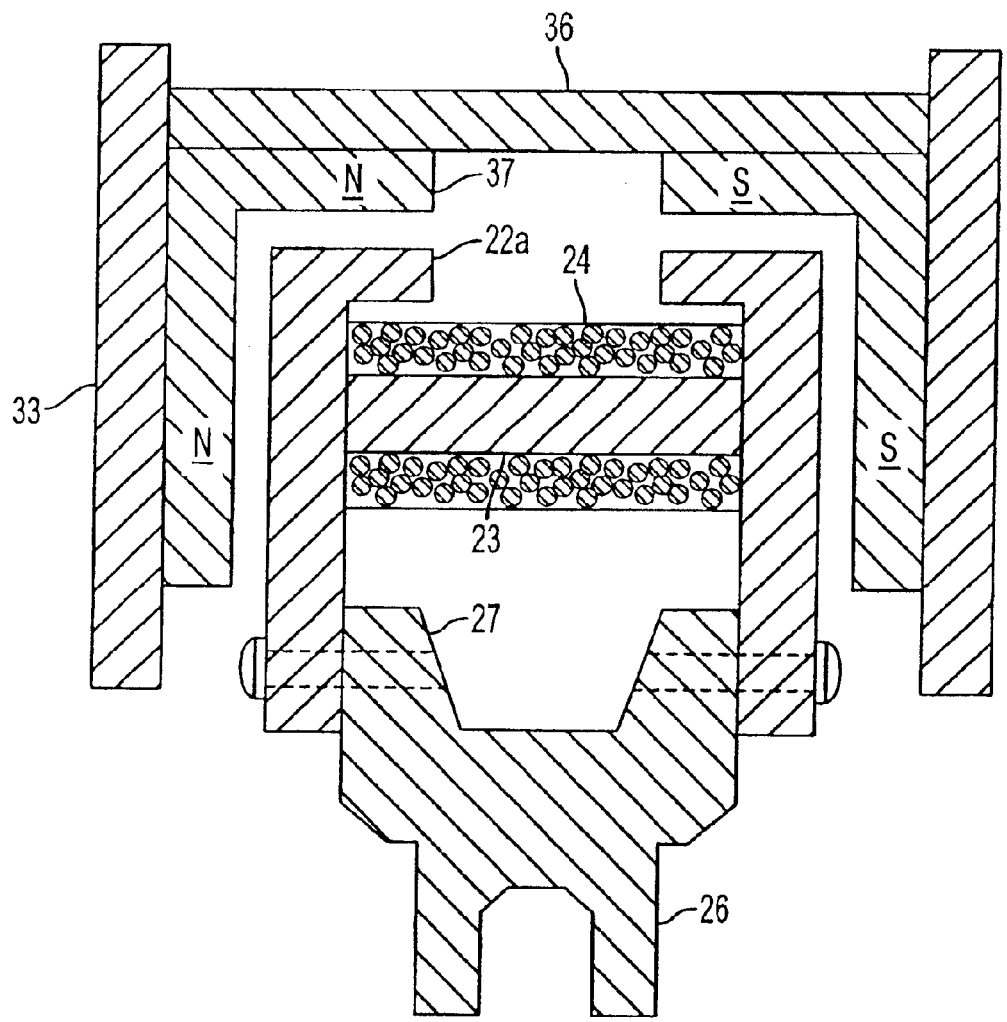
FIG. 8 is another variation of the cross section shown in FIG. 5 in accordance with the present invention.

FIG. 7 is a cross-sectional view of a variation of the structure of FIG. 5. Each stator pole face has an L-shaped cross sectional pole configuration, one portion of the "L" facing a rotor side portion across an axial air gap and the other portion of the "L" facing, at the outer stator diameter, the rotor cross portion across a radial air gap. The flux producing surface area across the radial gap is increased by the "L" extension of the stator pole and the increased length of the cross piece magnets, as compared with the configurations of FIGS. 5 and 6. FIG. 8 is a variation of FIG. 7 in which individual side portion magnets 34 and cross portion magnets 38 have been replaced by L-shaped magnets 37. This configuration provides the maximum continuous flux producing path in both the rotor and stator elements.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A rotary electric motor, comprising
   a rotor disposed in an annular ring configuration about an axis of rotation, the rotor comprising a U-shaped cross-sectional configuration having sides joined by a cross portion, and a plurality of permanent magnets formed on the sides and cross portion; and a stator at least partially surrounded by the rotor, the stator comprising a plurality of ferromagnetically isolated electromagnet core segments;

wherein the stator segments are separated from the rotor by a radial air gap and a plurality of axial air gaps; wherein each stator electromagnet core segment comprises a pair of poles aligned in a direction generally parallel to the axis of rotation and joined by a ferromagnetic connecting portion having a winding formed thereon; and each pole has a first pole surface, generally perpendicular to the axis of rotation and facing one of the axial air gaps, and a second surface facing the radial air gap.

2. A rotary electric motor as recited in claim 1, wherein the first pole surface is substantially perpendicular to the axis of rotation.

3. A rotary electric motor as recited in claim 1, wherein each said stator pole has a generally rectangular cross-sectional configuration.

4. A rotary electric motor as recited in claim 1, wherein each said stator pole has an L-shaped cross-sectional configuration.

5. A rotary electric motor as recited in claim 1, further comprising a non-ferromagnetic support structure;

wherein the electromagnet core segments are disposed coaxially about the axis of rotation to form an annular stator ring bounded by an inner and outer diameter, and each of said electromagnet core segments is separately secured to the support structure adjacent the inner diameter.

6. A rotary electric motor as recited in claim 1, wherein said permanent magnets are distributed along inner surfaces of the rotor sides and cross portion, thereby facing two axial air gaps and the radial air gap.

7. A rotary electric motor as recited in claim 6, wherein each permanent magnet is a magnetic dipole having one magnetic polarity at a surface facing the air gap and the opposite magnetic polarity at a surface facing away from the air gap, thereby forming a magnetic polar orientation in a direction perpendicular to the air gap.

8. A rotary electric motor as recited in claim 6, wherein the permanent magnets successively alternate in polarity along the rotor ring surfaces and the permanent magnets on the two side portions are respectively in axial alignment with each other, the axially aligned permanent magnets being of opposite magnetic polarity.

9. A rotary electric motor as recited in claim 8, wherein the plurality of permanent magnets on the cross portion comprises two sets of magnets, the magnets of each set respectively being adjacent to, and in axial alignment with, permanent magnets on one of the sides; and adjacent side magnets and cross portion magnets are of the same magnetic polarity.

10. A rotary electric motor as recited in claim 1, wherein each permanent magnet has an L-shaped cross-sectional configuration, a first surface thereof mounted to one of the rotor sides and a second surface thereof mounted to the rotor cross portion.

11. A rotary electric motor as recited in claim 10, wherein the permanent magnets successively alternate in polarity along the rotor ring surfaces and the permanent magnets on the two side portions are respectively in axial alignment with each other, the axially aligned permanent magnets being of opposite magnetic polarity.

* * * * *